US012589308B2

(12) United States Patent
Rao et al.

(10) Patent No.: US 12,589,308 B2
(45) Date of Patent: Mar. 31, 2026

(54) GENERATIVE NARRATIVE GAME EXPERIENCE WITH PLAYER FEEDBACK

(71) Applicant: Microsoft Technology Licensing, LLC, Redmond, WA (US)

(72) Inventors: Sudha Rao, Bothell, WA (US); William Brennan Dolan, Kirkland, WA (US); Christopher John Brockett, Kirkland, WA (US); Weijia Xu, Bellevue, WA (US); Nebojsa Jojic, Redmond, WA (US); Gabriel A. Desgarennes, Issaquah, WA (US); Yun Hui Xu, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 18/213,868

(22) Filed: Jun. 25, 2023

(65) Prior Publication Data

US 2024/0424405 A1 Dec. 26, 2024

(51) Int. Cl.
*A63F 13/67* (2014.01)
*A63F 13/47* (2014.01)
*A63F 13/65* (2014.01)

(52) U.S. Cl.
CPC .............. *A63F 13/67* (2014.09); *A63F 13/47* (2014.09); *A63F 13/65* (2014.09)

(58) Field of Classification Search
CPC .......... A63F 13/47; A63F 13/63; A63F 13/65; A63F 13/67
See application file for complete search history.

(56) References Cited

U.S. PATENT DOCUMENTS

| | | | |
|---|---|---|---|
| 7,149,970 B1 | 12/2006 | Pratley et al. | |
| 8,688,698 B1 | 4/2014 | Black et al. | |
| 10,105,608 B1 * | 10/2018 | George | A63F 13/211 |
| 10,853,398 B2 | 12/2020 | Fisher | |
| 2007/0066403 A1 * | 3/2007 | Conkwright | A63F 13/803 463/43 |
| 2011/0239119 A1 | 9/2011 | Phillips et al. | |
| 2011/0300847 A1 * | 12/2011 | Quy | H04W 4/00 455/419 |

(Continued)

FOREIGN PATENT DOCUMENTS

| | | |
|---|---|---|
| CN | 110599592 A | 12/2019 |
| CN | 108959271 B | 6/2020 |

(Continued)

OTHER PUBLICATIONS

International Search Report and Written Opinion received for PCT Application No. PCT/US2024/034565, Sep. 17, 2024, 15 pages.

(Continued)

*Primary Examiner* — Steve Rowland
(74) *Attorney, Agent, or Firm* — Schwegman Lundberg & Woessner, P.A.

(57) ABSTRACT

Described are systems and methods for evolving computer-implemented narrative games based on player feedback, levering generative artificial intelligence (AI), such as Generative Pre-Trained Transformer (GPT) or other foundation models, to create new game content responsive to player input, measure player engagement metrics during gameplay, and/or modify the game based on the generated new content and/or player engagement.

20 Claims, 6 Drawing Sheets

(56) References Cited

U.S. PATENT DOCUMENTS

| | | | |
|---|---|---|---|
| 2012/0028713 A1* | 2/2012 | Driemeyer | A63F 13/798 463/43 |
| 2012/0157197 A1* | 6/2012 | Watkins, Jr. | A63F 13/65 463/30 |
| 2012/0275714 A1* | 11/2012 | Gao | G06F 16/55 382/224 |
| 2013/0108994 A1 | 5/2013 | Srinivasa | |
| 2013/0145240 A1* | 6/2013 | Anderson | G06F 3/0483 715/776 |
| 2014/0004948 A1* | 1/2014 | Watkins, Jr. | A63F 13/655 463/36 |
| 2014/0223284 A1 | 8/2014 | Rankin, Jr. et al. | |
| 2015/0221169 A1* | 8/2015 | Filipour | G07F 17/3211 463/25 |
| 2016/0092428 A1 | 3/2016 | Llic et al. | |
| 2016/0103841 A1 | 4/2016 | Zupancic | |
| 2016/0246891 A1* | 8/2016 | Accardo | G06F 16/284 |
| 2016/0263477 A1* | 9/2016 | Ladd | A63F 13/212 |
| 2016/0274705 A1* | 9/2016 | Kapadia | A63F 13/60 |
| 2017/0220545 A1 | 8/2017 | Gururajan et al. | |
| 2018/0239833 A1 | 8/2018 | Zholudev et al. | |
| 2018/0359172 A1 | 12/2018 | Yadav | |
| 2019/0001219 A1 | 1/2019 | Sardari | |
| 2019/0005029 A1 | 1/2019 | Mills et al. | |
| 2019/0046879 A1* | 2/2019 | Halper | A63F 13/47 |
| 2019/0197402 A1 | 6/2019 | KovÁcs et al. | |
| 2019/0205772 A1 | 7/2019 | Kohlmeier et al. | |
| 2019/0251150 A1 | 8/2019 | Vishwa | |
| 2019/0354594 A1 | 11/2019 | Foster et al. | |
| 2019/0377785 A1 | 12/2019 | N et al. | |
| 2019/0388787 A1* | 12/2019 | Padmanabhan | A63F 13/47 |
| 2020/0097340 A1 | 3/2020 | Balik et al. | |
| 2020/0098353 A1 | 3/2020 | Olabiyi | |
| 2020/0137463 A1 | 4/2020 | Kumar et al. | |
| 2020/0155943 A1* | 5/2020 | Eatedali | A63F 13/67 |
| 2020/0206631 A1* | 7/2020 | Sumant | A63F 13/55 |
| 2020/0226871 A1* | 7/2020 | Itzkowitz | G07F 17/3211 |
| 2020/0336804 A1* | 10/2020 | Cui | H04N 21/4781 |
| 2020/0342164 A1 | 10/2020 | Satterfield et al. | |
| 2020/0405213 A1 | 12/2020 | Chappell, III | |
| 2021/0086089 A1* | 3/2021 | Pardeshi | G06N 3/04 |
| 2021/0097133 A1 | 4/2021 | Liao et al. | |
| 2021/0158811 A1 | 5/2021 | Di Fabbrizio et al. | |
| 2021/0165481 A1* | 6/2021 | Brugarolas Brufau | A63F 13/67 |
| 2021/0283505 A1 | 9/2021 | Bansal | |
| 2021/0304636 A1* | 9/2021 | Desmond | G09B 5/06 |
| 2021/0312301 A1 | 10/2021 | Azmandian | |
| 2021/0374863 A1 | 12/2021 | Zarlengo | |
| 2022/0016519 A1* | 1/2022 | Van Der Steen | A63F 13/21 |
| 2022/0035640 A1 | 2/2022 | Daei | |
| 2022/0088474 A1 | 3/2022 | Dicken | |
| 2022/0168653 A1* | 6/2022 | Weising | A63F 13/847 |
| 2022/0198135 A1 | 6/2022 | Peleg | |
| 2022/0414320 A1 | 12/2022 | Dolan et al. | |
| 2023/0122202 A1 | 4/2023 | Dolan et al. | |
| 2023/0123430 A1 | 4/2023 | Dolan et al. | |
| 2023/0123535 A1 | 4/2023 | Dolan et al. | |
| 2023/0124765 A1 | 4/2023 | Desgarennes et al. | |
| 2023/0125036 A1 | 4/2023 | Volum et al. | |
| 2023/0381665 A1 | 11/2023 | Dolan | |

FOREIGN PATENT DOCUMENTS

| | | | |
|---|---|---|---|
| EP | 0992007 B1 | 12/2009 | |
| WO | 2009076555 A2 | 6/2009 | |
| WO | 2018004839 A1 | 1/2018 | |
| WO | 2021003471 A1 | 1/2021 | |
| WO | 2021076302 A1 | 4/2021 | |
| WO | 2021108164 A1 | 6/2021 | |

OTHER PUBLICATIONS

Kybartas, et al., "Analysis of ReGEN as a Graph-Rewriting System for Quest Generation", IEEE Transactions on Computational Intelligence and AI in Games, vol. 6, Issue 2, Nov. 7, 2013, pp. 228-242.

Final Office Action mailed on Feb. 1, 2024, in U.S. Appl. No. 17/517,329, 21 pages.

Non-Final Office Action mailed on Jan. 18, 2024, in U.S. Appl. No. 17/356,440, 29 pages.

Gao, et al., "Jointly Optimizing Diversity and Relevance in Neural Response Generation", In Proceedings of the Conference of the North American Chapter of the Association for Computational Linguistics: Human Language Technologies, vol. 1 (Long and Short Papers), Jun. 2, 2019, pp. 1229-1238.

Gao, et al., "Neural Approaches to Conversational AI", In Journal of Foundations and Trends® in Information Retrieval, vol. 13, No. 2-3, 2019, 64 Pages.

Gao, et al., "Structuring Latent Spaces for Stylized Response Generation", In Proceedings of the Conference on Empirical Methods in Natural Language Processing and the 9th International Joint Conference on Natural Language Processing, Nov. 3, 2019, pp. 1814-1823.

Ghazvininejad, et al., "A Knowledge-Grounded Neural Conversation Model", In Proceedings of the Thirty-Second AAAI Conference on Artificial Intelligence, Apr. 2, 2018, pp. 5110-5117.

Gupta, et al., "A Deep Generative Framework for Paraphrase Generation", In Proceedings of the Thirty-Second AAAI Conference on Artificial Intelligence, Feb. 2, 2018, pp. 5149-5156.

Guu, et al., "Generating Sentences by Editing Prototypes", In Journal of Transactions of the Association for Computational Linguistics, vol. 6, 2018, pp. 437-450.

Guu, et al., "REALM: Retrieval-Augmented Language Model Pre-Training", In Repository of arXiv:2002.08909v1, Feb. 10, 2020, 12 Pages.

Harrison, et al., "Toward Automated Story Generation with Markov Chain Monte Carlo Methods and Deep Neural Networks", In Journal of the Workshops of the Thirteenth AAAI Conference on Artificial Intelligence and Interactive Digital Entertainment, vol. 13, Issue 2, Oct. 5, 2017, 7 Pages.

Hokamp, et al., "Lexically Constrained Decoding for Sequence Generation Using Grid Beam Search", In Proceedings of the 55th Annual Meeting of the Association for Computational Linguistics, Jul. 30, 2017, pp. 1535-1546.

Zhao, et al., "Unsupervised Discrete Sentence Representation Learning for Interpretable Neural Dialog Generation", In Proceedings of the 56th Annual Meeting of the Association for Computational Linguistics, Jul. 15, 2018, pp. 1098-1107.

Holtzman, et al., "The Curious Case of Neural Text Degeneration", In Proceedings of the International Conference on Learning Representations, Apr. 26, 2020, pp. 1-16.

Hu, et al., "Improved Lexically Constrained Decoding for Translation and Monolingual Rewriting", In Proceedings of the Conference of the North American Chapter of the Association for Computational Linguistics: Human Language Technologies, vol. 1 (Long and Short Papers), Jun. 2, 2019, pp. 839-850.

Hu, et al., "PARABANK: Monolingual Bitext Generation and Sentential Paraphrasing via Lexically-Constrained Neural Machine Translation", In Proceedings of the AAAI Conference on Artificial Intelligence, Jan. 27, 2019, pp. 6521-6528.

Hu, et al., "Toward Controlled Generation of Text", In Proceedings of the 34th International Conference on Machine Learning, vol. 70, Aug. 6, 2017, 10 Pages.

Ippolito, et al., "Unsupervised Hierarchical Story Infilling", In Proceedings of the First Workshop on Narrative Understanding, Jun. 7, 2019, pp. 37-43.

Iso, et al., "Fact-based Text Editing", In Proceedings of the 58th Annual Meeting of the Association for Computational Linguistics, Jul. 5, 2020, pp. 171-182.

(56) References Cited

OTHER PUBLICATIONS

Jain, et al., "Story Generation from Sequence of Independent Short Descriptions", In Repository of arXiv:1707.05501v2, Aug. 21, 2017, 7 Pages.

Keskar, et al., "Ctrl: A Conditional Transformer Language Model for Controllable Generation", In Repository of arXiv:1909. 05858v2, Sep. 20, 2019, pp. 1-18.

Kiss, et al., "Unsupervised Multilingual Sentence Boundary Detection", In Journal of Computational Linguistics, vol. 32, No. 4, Dec. 2006, pp. 485-525.

Koncel-Kedziorski, et al., "Text Generation from Knowledge Graphs with Graph Transformers", In Proceedings of the Conference of the North American Chapter of the Association for Computational Linguistics: Human Language Technologies, vol. 1 (Long and Short Papers), Jun. 2, 2019, pp. 2284-2293.

Lebowitz, Michael, "Story Telling as Planning and Learning", In Journal of Poetics, vol. 14, Issue 6, Nov. 1985, 25 Pages.

Li, et al., "A Diversity-Promoting Objective Function for Neural Conversation Models", In Proceedings of the Conference of the North American Chapter of the Association for Computational Linguistics: Human Language Technologies, Jun. 12, 2016, pp. 110-119.

Zhang, et al., "DialoGPT: Large-scale Generative Pre-training for Conversational Response Generation", In Proceedings of the 58th Annual Meeting of the Association for Computational Linguistics, Jul. 5, 2020, pp. 270-278.

Liu, et al., "Generating Wikipedia by Summarizing Long Sequences", In Repository of arXiv:1801.10198v1, Jan. 30, 2018, pp. 1-18.

Liu, et al., "Knowledge Aware Conversation Generation with Explainable Reasoning over Augmented Graphs", In Proceedings of the Conference on Empirical Methods in Natural Language Processing and the 9th International Joint Conference on Natural Language Processing, Nov. 3, 2019, pp. 1782-1792.

Liu, et al., "Knowledge Diffusion for Neural Dialogue Generation", In Proceedings of the 56th Annual Meeting of the Association for Computational Linguistics (Long Papers), Jul. 15, 2018, pp. 1489-1498.

Liu, et al., "Table-to-Text Generation by Structure-Aware Seq2seq Learning", In Proceedings of the AAAI Conference on Artificial Intelligence, Feb. 2, 2018, pp. 4881-4888.

Marrese-Taylor, et al., "Variational Inference for Learning Representations of Natural Language Edits", In Repository of arXiv:2004. 09143v1, Apr. 20, 2020, 11 Pages.

Martin, et al., "Event Representations for Automated Story Generation with Deep Neural Nets", In Repository of arXiv:1706. 01331v3, Sep. 12, 2017, 9 Pages.

Miao, et al., "CGMH: Constrained Sentence Generation by Metropolis-Hastings Sampling", In Proceedings of the 33rd AAAI Conference on Artificial Intelligence, Jul. 17, 2019, pp. 6834-6842.

Min, et al., "Knowledge Guided Text Retrieval and Reading for Open Domain Question Answering", In Repository of arXiv:1911. 03868v1, Nov. 10, 2019, 11 Pages.

Moghe, et al., "Towards Exploiting Background Knowledge for Building Conversation Systems", In Proceedings of the Conference on Empirical Methods in Natural Language Processing, Oct. 31, 2018, pp. 2322-2332.

Papineni, et al., "BLEU: A Method for Automatic Evaluation of Machine Translation", In Proceedings of 40th Annual Meeting on Association for Computational Linguistics, Jul. 7, 2002, 8 Pages.

Peng, et al., "Towards Controllable Story Generation", In Proceedings of the First Workshop on Storytelling, Jun. 5, 2018., pp. 43-49.

Pirolli, et al., "The Sensemaking Process and leverage Points for Analyst Technology as Identified Through Cognitive Task Analysis", In Proceedings of International Conference on Intelligence Analysis, vol. 5, May 2, 2005, 6 Pages.

Prabhumoye, et al., "Towards Content Transfer through Grounded Text Generation", In Repository of arXiv:1905.05293v1, May 13, 2019, 11 Pages.

Qin, et al., "Conversing by Reading: Contentful Neural Conversation with On-demand Machine Reading", In Proceedings of the 57th Annual Meeting of the Association for Computational Linguistics, Jul. 28, 2019, pp. 5427-5436.

Radford, et al., "Language Models are Unsupervised Multitask Learners", Retrieved From: https://cdn.openai.com/better-language-models/language_models_are_unsupervised_multitask_learners. pdf, Feb. 14, 2019, 24 Pages.

Raffel, et al., "Exploring the Limits of Transfer Learning with A Unified Text-to-Text Transformer", In Repository of arXiv:1910. 10683v1, Oct. 23, 2019, pp. 1-52.

Rashkin, et al., "PLOTMACHINES: Outline-Conditioned Generation with Dynamic Plot State Tracking", In Proceedings of the Conference on Empirical Methods in Natural Language Processing, Nov. 16, 2020, pp. 4274-4295.

See, et al., "What Makes a Good Conversation? How Controllable Attributes Affect Human Judgments", In Proceedings of the Conference of the North American Chapter of the Association for Computational Linguistics: Human Language Technologies, vol. 1, Jun. 2, 2019, pp. 1702-1723.

Shang, et al., "Neural Responding Machine for Short-Text Conversation", In Proceedings of the 53rd Annual Meeting of the Association for Computational Linguistics and the 7th International Joint Conference on Natural Language Processing, Jul. 26, 2015, pp. 1577-1586.

Sordoni, et al., "A Neural Network Approach to Context-Sensitive Generation of Conversational Responses", In Proceedings of the Conference of the North American Chapter of the Association for Computational Linguistics:Human Language Technologies, May 31, 2015, pp. 196-205.

Sun, et al., "The Feasibility of Embedding Based Automatic Evaluation for Single Document Summarization", In Proceedings of the Conference on Empirical Methods in Natural Language Processing and the 9th International Joint Conference on Natural Language Processing, Nov. 3, 2019, pp. 1216-1221.

Tambwekar, et al., "Controllable Neural Story Plot Generation via Reward Shaping", In Proceedings of the Twenty-Eighth International Joint Conference on Artificial Intelligence, Aug. 10, 2019, pp. 5982-5988.

Tang, et al., "Target-Guided Open-Domain Conversation", In Proceedings of the 57th Annual Meeting of the Association for Computational Linguistics, Jul. 28, 2019, pp. 5624-5634.

Vaswani, et al., "Attention Is All You Need", In Proceedings of the 31st Conference on Neural Information Processing Systems, Dec. 4, 2017, pp. 1-11.

Mnyals, et al., "A Neural Conversational Model", In Repository of arXiv:1506.05869v3, Jul. 22, 2015, 8 Pages.

Wiseman, et al., "Challenges in Data-to-Document Generation", In Repository of arxiv:/1707.08052v1, Jul. 25, 2017, 13 Pages.

Wu, et al., "A Controllable Model of Grounded Response Generation", In Repository of arXiv:2005.00613v1, May 1, 2020, 11 Pages.

Non-Final Office Action mailed on Apr. 2, 2025, in U.S. Appl. No. 17/517,378, 20 Pages.

"Black & White (video game)", Retrieved From: https://en.wikipedia. org/w/index.php?title=Black_%26_White (video_game)&oldid= 1083759441, Apr. 20, 2022, 21 Pages.

"GitHub Copilot", Retrieved from: https://web.archive.org/web/ 20210927023930/https://copilot.github.com/, Sep. 27, 2021, pp. 1-16.

"Leisure Suit Larry (PC/DOS) 1987, Sierra On-Line (AGI, EGA)", Retrieved From: https://www.youtube.com/watch? V=FpOnfDW2iJo, Sep. 14, 2017, 3 Pages.

"Mineflayer", Retrieved from: https://web.archive.org/web/ 20210410144547/https://mineflayer.prismarine.js.org/#/, Apr. 10, 2021, pp. 1-10.

"OpenAI Codex", Retrieved from: https://web.archive.org/web/ 20210708045044/https://gpt3demo.com/apps/openai-codex, Jul. 8, 2021, pp. 1-7.

"Wikimedia Downloads", Retrieved from: https://web.archive.org/ web/20210505181954/https://dumps.wikimedia.org/, May 5, 2021, pp. 1-3.

(56) References Cited

OTHER PUBLICATIONS

"Final Office Action Issued in U.S. Appl. No. 17/356,440", Mailed Date: Dec. 8, 2022, 30 Pages.

"Non Final Office Action Issued in U.S. Appl. No. 17/356,440", Mailed Date: Apr. 19, 2022, 24 Pages.

"Non Final Office Action Issued In U.S. Appl. No. 17/517,329", Mailed Date: Oct. 10, 2023, 15 Pages.

Attardi, et al., "WikiExtractor", Retrieved from: https://github.com/attardi/wikiextractor, Jan. 24, 2023, pp. 1-8.

Bird, et al., "Natural Language Processing with Python", In Publication of O'Reilly Media, Jun. 2009, 502 Pages.

Bommasani, et al., "On the Opportunities and Risks of Foundation Models", In Repository of arXiv:2108.07258v1, Aug. 16, 2021, pp. 1-211.

Brown, et al., "Language Models are Few-Shot Learners", In Repository of arXiv:2005.14165v1, May 28, 2020, pp. 1-72.

Chang, et al., "SceneSeer: 3D Scene Design with Natural Language", In Repository of arXiv:1703.00050v1, Feb. 28, 2017, pp. 1-10.

Chen, et al., "Reading Wikipedia to Answer Open-Domain Questions", In Repository of arXiv:1704.00051v2, Apr. 28, 2017, 10 Pages.

Dathathri, et al., "Plug and Play Language Models: A Simple Approach to Controlled Text Generation", In Repository of arXiv:1912.02164v3, Jan. 8, 2020, pp. 1-34.

Dinan, et al., "Wizard of Wikipedia: Knowledge-powered Conversational Agents", In Repository of arXiv:1811.01241v2, Feb. 21, 2019, pp. 1-18.

Doddington, George, "Automatic Evaluation of Machine Translation Quality using N-gram Co-Occurrence Statistics", In Proceedings of the Second International Conference on Human Language Technology, Mar. 24, 2002, pp. 138-145.

Dong, et al., "Learning to Generate Product Reviews from Attributes", In Proceedings of the 15th Conference of the European Chapter of the Association for Computational Linguistics: vol. 1, Long Papers, Apr. 3, 2017, pp. 623-632.

Faltings, et al., "Text Editing by Command", In Repository of arXiv:2010.12826v1, Oct. 24, 2020, 14 Pages.

Fan, et al., "Hierarchical Neural Story Generation", In Proceedings of the 56th Annual Meeting of the Association for Computational Linguistics, Jul. 15, 2018, pp. 889-898.

Faruqui, et al., "WikiAtomicEdits: A Multilingual Corpus of Wikipedia Edits for Modeling Language and Discourse", In Repository of arXiv:1808.09422v1, Aug. 28, 2018, 11 Pages.

Ficler, et al., "Controlling Linguistic Style Aspects in Neural Language Generation", In Proceedings of the Workshop on Stylistic Variation, Sep. 7, 2017, pp. 94-104.

Florez-Puga, et al., "Query-Enabled Behavior Trees", In IEEE Transactions on Computational Intelligence and AI in Games, vol. 1, Issue 4, Dec. 2009, pp. 298-308.

Guckelsnerger, et al., "New And Surprising Ways to Be Mean", In Proceedings of IEEE Conference on Computational Intelligence and Games, Aug. 14, 2018, 8 Pages.

Kluwer, et al., "Talking NPCs in a Virtual Game World", In Proceedings of the ACL System Demonstrations, Jul. 13, 2010, pp. 36-41.

Li, et al., "A Persona-Based Neural Conversation Model", In Proceedings of the 54th Annual Meeting of the Association for Computational Linguistics, Aug. 7, 2016, pp. 994-1003.

Li, et al., "Automatic 3D Scene Generation based on Maya", In Proceedings of IEEE 10th International Conference on Computer-Aided Industrial Design & Conceptual Design, Nov. 26, 2009, pp. 981-985.

Luan, et al., "Multi-Task Learning for Speaker-Role Adaptation in Neural Conversation Models", In Proceedings of the 8th International Joint Conference on Natural Language Processing, Nov. 27, 2017, pp. 605-614.

Ma, et al., "Language-Driven Synthesis of 3D Scenes from Scene Databases", In Journal of ACM Transactions on Graphics, vol. 37, Issue 6, Nov. 2018, 16 Pages.

Mousavi, et al., "Deep Reinforcement Learning: An Overview", In Repository of arXiv:1806.08894v1, Jun. 23, 2018, pp. 1-17.

Nan, et al., "Deep NLP-based Co-evolvement for Synthesizing Code Analysis from Natural Language", In Proceedings of the 30th ACM SIGPLAN International Conference on Compiler Construction, Mar. 2, 2021, pp. 141-152.

Parisotto, et al., "Actor-Mimic: Deep Multitask and Transfer Reinforcement Learning", In Repository of arXiv:1511.06342v4, Feb. 22, 2016, pp. 1-16.

"International Search Report and Written Opinion Issued in PCT Application No. PCT/US22/030156", Mailed Date: Jul. 19, 2022, 13 Pages.

"International Search Report and Written Opinion Issued in PCT Application No. PCT/US22/044051", Mailed Date: Jan. 5, 2023, 10 Pages.

"International Search Report and Written Opinion Issued in PCT Application No. PCT/US22/044303", Mailed Date: Jan. 5, 2023, 10 Pages.

"International Search Report and Written Opinion Issued in PCT Application No. PCT/US22/044776", Mailed Date: Jan. 18, 2023, 10 Pages.

"International Search Report and Written Opinion Issued in PCT Application No. PCT/US22/046633", Mailed Date: Jan. 19, 2023, 12 Pages.

"International Search Report and Written Opinion Issued in PCT Application No. PCT/US22/046634", Mailed Date: Jan. 20, 2023, 12 Pages.

"International Search Report and Written Opinion Issued in PCT Application No. PCT/US23/019020", Mailed Date: Sep. 4, 2023, 15 Pages.

"Invitation to Pay Additional Fees Issued in PCT Application No. PCT/US23/019020", Mailed Date: Jul. 14, 2023, 9 Pages.

"International Search Report and Written Opinion Issued in PCT Application No. PCT/US23/019022", Mailed Date: Sep. 4, 2023, 17 Pages.

"Invitation to Pay Additional Fees Issued in PCT Application No. PCT/US23/019022", Mailed Date: Jul. 12, 2023, 11 Pages.

"Invitation to Pay Additional Fee Issued in PCT Application No. PCT/US23/023263", Mailed Date: Sep. 6, 2023, 10 Pages.

Presland, et al., "Creating Complex Interactive 3D Visualisations of Naval Battles from Natural Language Narratives", In Proceedings of Developments in E-systems Engineering, Sep. 6, 2010, pp. 113-118.

Quirk, et al., "Language to Code: Learning Semantic Parsers for If-This-Then-That Recipes", In Proceedings of the 53rd Annual Meeting of the Association for Computational Linguistics and the 7th International Joint Conference on Natural Language Processing, Jul. 26, 2015, pp. 878-888.

Seversky, et al., "Real-time Automatic 3D Scene Generation from Natural Language Voice and Text Descriptions", In Proceedings of the 14th ACM international conference on Multimedia, Oct. 23, 2006, 4 Pages.

Simonini, Thomas, "Jammo the Robot", Retrieved from: https://github.com/simoninithomas/jammo_the_robot, Sep. 16, 2021, 2 Pages.

Zhu, et al., "Flexible End-to-End Dialogue System for Knowledge Grounded Conversation", In Repository of arXiv:1709.04264v1, Sep. 13, 2017, 8 Pages.

Zhou, et al., "A Dataset for Document Grounded Conversations", In Proceedings of the Conference on Empirical Methods in Natural Language Processing, Oct. 31, 2018, pp. 708-713.

Non-Final Office Action mailed on May 9, 2024, in U.S. Appl. No. 17/517,329, 17 pages.

Wu, et al., "Response Generation by Context-Aware Prototype Editing", In Proceedings of The Thirty-Third AAAI Conference on Artificial Intelligence, Jan. 27, 2019, pp. 7281-7288.

Xu, et al., "A Skeleton-based Model for Promoting Coherence among Sentences in Narrative Story Generation", In Proceedings of the Conference on Empirical Methods in Natural Language Processing, Oct. 31, 2018, pp. 4306-4315.

Yang, et al., "Identifying Semantic Edit Intentions from Revisions in Wikipedia", In Proceedings of the Conference on Empirical Methods in Natural Language Processing, Sep. 7, 2017, pp. 2000-2010.

(56)        References Cited

OTHER PUBLICATIONS

Yao, et al., "Plan-and-Write: Towards Better Automatic Storytelling", In Repository of arXiv:1811.05701v3, Feb. 19, 2019, 11 Pages.

Yavuz, et al., "DeepCopy: Grounded Response Generation with Hierarchical Pointer Networks", In Proceedings of the 32nd Conference on Neural Information Processing Systems, Dec. 3, 2018, pp. 1-10.

Yin, et al., "Learning to Represent Edits", In Repository of arXiv:1810.13337v2, Feb. 22, 2019, pp. 1-22.

Young, et al., "Augmenting End-to-End Dialogue Systems with Commonsense Knowledge", In Proceedings of the Thirty-Second AAAI Conference on Artificial Intelligence, Feb. 2, 2018, pp. 4970-4977.

Zellers, et al., "Defending Against Neural Fake News", In Journal of Advances in Neural Information Processing Systems, Dec. 8, 2019, pp. 1-12.

Zhang, et al., "BERTScore: Evaluating text generation with BERT", In Repository of arXiv:1904.09675v3, Feb. 24, 2020, pp. 1-43.

Zhang, et al., "Modeling the Relationship between User Comments and Edits in Document Revision", In Proceedings of the Conference on Empirical Methods in Natural Language Processing and the 9th International Joint Conference on Natural Language Processing, Nov. 3, 2019, pp. 5002-5011.

Zhang, et al., "Pointer: Constrained Text Generation via Insertion-based Generative Pre-training", In Repository of arXiv:2005.00558v2, Sep. 27, 2020, 22 Pages.

Non-Final Office Action mailed on Sep. 28, 2024, in U.S. Appl. No. 17/961,189, 56 pages.

Final Office Action mailed on Oct. 24, 2024, in U.S. Appl. No. 17/517,329, 15 pages.

Final Office Action mailed on Feb. 13, 2025, in U.S. Appl. No. 17/961,189, 60 Pages.

Non-Final Office Action mailed on Dec. 31, 2024, in U.S. Appl. No. 17/356,440, 47 Pages.

Final Office Action mailed on Jul. 18, 2024, in U.S. Appl. No. 17/356,440, 41 pages.

Non-Final Office Action mailed on Oct. 3, 2025, in U.S. Appl. No. 17/517,329, 15 pages.

Final Office Action mailed on Jun. 10, 2025, in U.S. Appl. No. 17/356,440, 34 pages.

Kluwer, et al., "Talking NPCs in a Virtual Game World", In Proceedings of the ACL 2010 System Demonstrations, 2010, pp. 36-41.

Non-Final Office Action mailed on Sep. 11, 2025, in U.S. Appl. No. 17/961,189, 70 Pages.

Non-final office action mailed on Oct. 10, 2025, in U.S. Appl. No. 17/959,706, 15 pages.

First Examination Report Received for Indian Application No. 202417027794, mailed on Nov. 26, 2025, 08 pages.

Non-Final Office Action mailed on Nov. 25, 2025, in U.S. Appl. No. 17/356,440 21 pages.

Communication pursuant to Article 94(3) received for European Application No. 22729983.1, mailed on Dec. 4, 2025, 09 Pages.

International Preliminary Report on Patentability (Chapter I) received for PCT Application No. PCT/US2024/034565, mailed on Jan. 8, 2026, 9 Pages.

Final Office Action mailed on Feb. 19, 2026, in U.S. Appl. No. 17/517,329, 20 pages.

* cited by examiner

300

400

RECEIVE DESIGNER INPUT COMPRISING HIGH-LEVEL DESCRIPTION OF GAME — 402

PROVIDE DESIGNER INPUT AS PROMPT TO GENERATIVE MODEL — 404

OPERATE GENERATIVE MODEL TO CREATE GAME CONTENT — 406

DISPLAY VISUAL REPRESENTATION OF GAME CONTENT TO DESIGNER — 408

RECEIVE DESIGNER INPUT COMPRISING MODIFICATION OF VISUAL REPRESENTATION OR ADDITIONAL DESCRIPTION — 410

GENERATIVE NARRATIVE GAME EXPERIENCE WITH PLAYER FEEDBACK

BACKGROUND

Video game creation has, traditionally, been an extremely labor-intensive artisanal process. While powerful game engines can handle the rendition of a virtual world and the implementation of the game mechanics, which may involve complex three-dimensional graphics computations and physics simulations, they do not by themselves define the game world and game narrative needed to provide a playable experience. This task, instead, generally falls to game designers and developers, who carefully design a game world, replete with characters, objects, and other assets for the player to explore and interact with, along with a set of goals or objectives for the player to complete, which are often woven into a game storyline with multiple paths to the ultimate game objective. The success of a game depends in no small part on these narrative aspects of the game, and as such conventionally on the game designer's intuition in predicting what appeals to players.

SUMMARY

Described herein is an approach to game creation that harnesses the power of generative artificial intelligence (AI)—as embodied, for example, in Generative Pre-Trained Transformer (GPT) models—to aid in the creation of the game narrative, as well as to allow players to contribute to the evolution of the game via implicit feedback.

In one aspect, generative AI acts as a "co-pilot" to game designers, enabling them to orchestrate game creation, including character definition, narrative design, and world creation, at a high level using natural-language descriptions (optionally in conjunction with other input modalities, such as images or audio files). The high-level descriptions serve as prompts from which a generative AI model (hereinafter also "generative machine-learning model" or simply "generative model") can then automatically create concrete implementations, potentially providing many creative variations to choose among. The game designer may augment or refine the prompt based on the model output, e.g., by directly modifying a visual representation of the model output. In this manner, game designers can use generative AI to iteratively design the game (or an initial version of the game).

In another aspect, players have the potential to become co-creators of the game as a result of their exploration of and interaction with the game, and their level of engagement along the way, which may be tracked and used as implicit feedback for the next iteration of the game. The game may allow for very different gameplay per player and session, and player engagement may be assessed for the different gameplay possibilities based on engagement metrics collected along the players' individual paths through the game. The game may also allow players to diverge from the pre-defined game experience and explore new possibilities of gameplay, including by interacting with integrated computer-controlled agents that prompt generative models to create new game content responsive to player input on the fly. Such newly created content and/or newly explored paths through the game can then be folded into the game experience in its next iteration, e.g., manually by the designer or by generative AI participating in game creation. In this manner, game designers and players can jointly create games, leveraging generative models in game design (prior to or in between deployments of successive game versions), for content generation during game deployment, as well as optionally for measuring player engagement.

The foregoing high-level summary is intended merely to provide a general flavor of the inventive subject matter, and not to define elements or features as essential for each embodiment or otherwise limit the scope of the claimed invention. Various embodiments are in the following described in more detail and with reference to the accompanying drawings. While this disclosure discusses the inventive subject matter specifically with reference to video games, a person of skill in the art will understand that applications to text-based or other types of computer games, as well as potentially to other forms of current or future computer-implemented interactive entertainment, are also contemplated; all of these types of games are herein collectively referred to as "computer-implemented narrative games" or simply "games").

DETAILED DESCRIPTION

Described herein are system and methods for leveraging generative machine-learning models in various ways in the creation of computer-implemented narrative games and the continual evolution of such games based on player feedback. Generative models are models that, given an input, generate new data based on the statistical distribution of and/or patterns in the training data. They support multiple turns of user input and model response (e.g., in the context of language models, an entire conversation). The initial input, often referred to as a "prompt," sets the context of the entire (multi-turn) interaction. The response at each turn may be based not only on the current user input, but also the history of previous user inputs and model responses.

Various embodiments discussed herein employ, in particular, "foundation models," which are large generative models pre-trained on vast amounts of data at scale to learn a general-purpose representation of the data that allows them to serve as a foundation for accomplishing, via suitable adaptations, a wide range of tasks. Generative models may be specific to a particular type of data, such as natural language or images, or may be multi-modal, that is, able to process and generate multiple types of data. Generative foundation models adapted to generate human language (although possibly capable of processing other types of data as well) are commonly known as large language models (LLMs). Examples of LLMs that are readily available include GPT-3, GPT-4, BLOOM, and LLaMA; these models use the Transformer deep-learning architecture. Note, however, that generative models may also be based on other types of machine-learning architectures.

Figure 1:
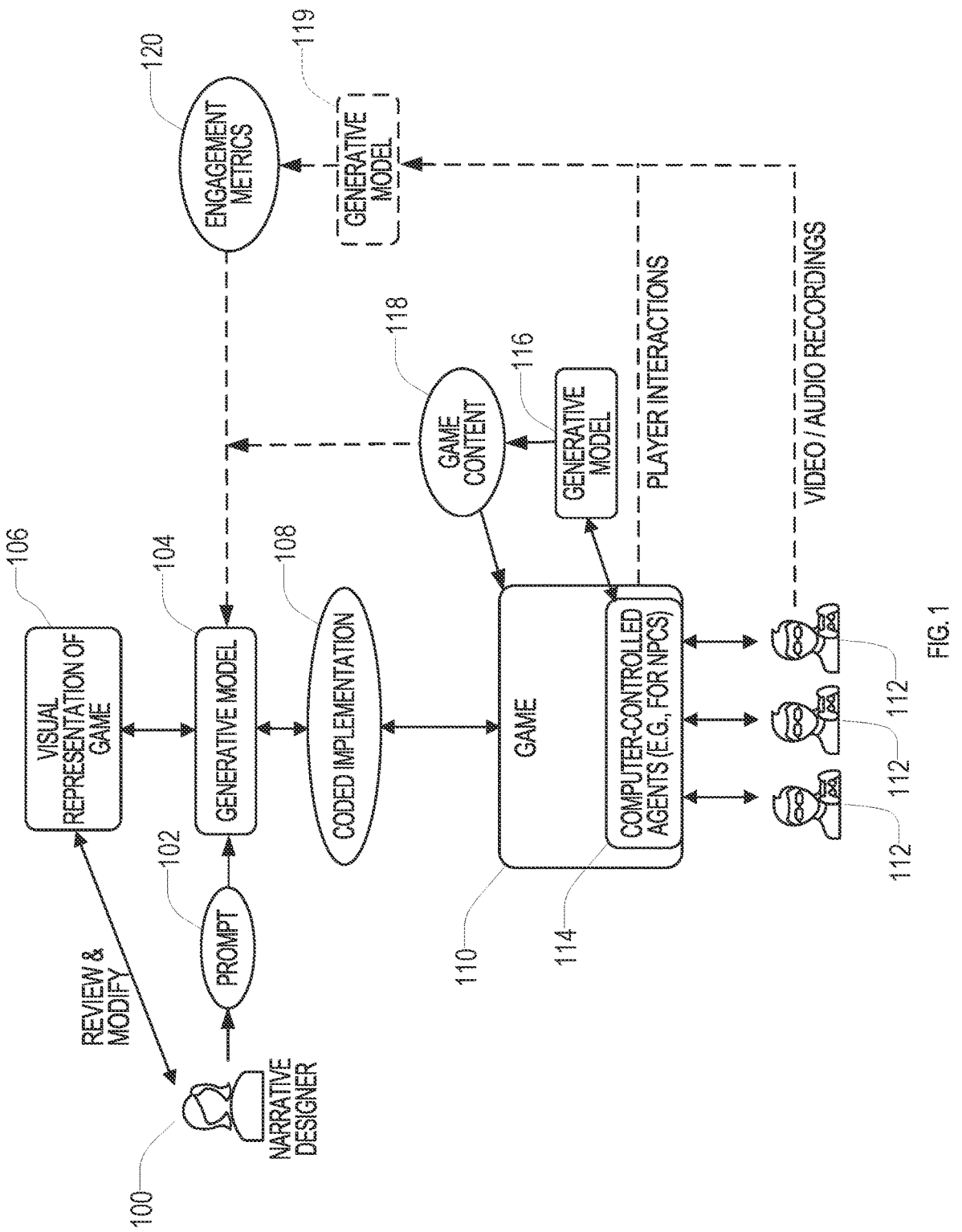
FIG. 1 is a conceptual diagram illustrating how a game can be jointly created by game designers, players, and generative AI.

FIG. 1 is a conceptual diagram illustrating how a game can be jointly created by game designers, players, and generative AI. To start designing the game, a game designer 100 (or group of game designers) provides a prompt 102—often text, although spoken language and other input modalities are also possible—to a generative machine-learning model (or models) 104. The prompt may be very high-level, e.g., provide merely a general theme, idea, or goal for the game or characterize the general nature of the game, or it may include some narrative details, such as main characters, a basic storyline, etc. Based on the prompt 102, the generative model 104 creates the game content, which includes filling in the narrative details of the game, e.g., defining the player and non-player characters, one or more plot lines, plot-relevant objects and their properties, goals and sub-goals for the player to achieve, and details of the game world in which the story is set. The output of the generative model 104 may include a visual representation 106 of the game (e.g., in the form of text, images, and/or graphs) for the benefit of the designer 100. Based on the visual representation 106, the game designer 100 may refine the original prompt. Alternatively, the game designer 100 may directly modify the visual representation 106, which may itself serve as revised prompt to the generative model 104, from which the model 104 then creates a revised output. Game designer 100 and generative model 104 can iterate until the game designer 100 is satisfied with the game as reflected in the visual representation 106.

In addition to the visual representation 106, the generative model 104 may also automatically generate a coded implementation 108 of the game, e.g., suitable as input to a game engine. Thus, once the initial game design is finalized, the game 110 can be deployed. In some embodiments, the narrative game experience created by the model 104 with input from the designer 100 is integrated into a pre-existing game, for instance, a "sandbox" game (e.g., Minecraft) that provides players a game world to explore and create in, but does not itself provide a storyline or narrative for the player to follow. In this case, the narrative game experience may be implemented, e.g., with application programming interface (API) calls to the pre-existing game. Both a pre-existing game enhanced by model-generated narrative game content and a game created wholesale by the model 104 (in either case with input from the game designer 100) are hereinafter referred to simply as "the game" 110.

Once the game 110 is deployed, one or more players 112 can interact with the game 110. These interactions may include, in particular, interactions with non-player characters (NPCs) (which may be human or other animate characters as well as animated characters (e.g., talking rocks), and may include fantastical and hostile characters, and even non-embodied characters (akin to, e.g., Siri)) or other interactive game assets (e.g., objects or machines that react in certain active ways to different manipulations, e.g., by opening, blowing up, playing music, etc.). The NPCs and other assets may be implemented with grounded computer-controlled agents 114, that is, sub-programs of the game that process player input with a generative machine-learning model 116 (which may be an instance of the same model 104 as used to create the narrative game experience, or a different model) to affect the operation of the game in some manner. For example, the computer-controlled agents associated with NPCs are usually conversational agents that process natural-language player input to generate natural-language NPC output, thereby facilitating a conversation between the player character and the NPC. By using the player utterances, optionally along with contextual information (e.g., the current state of the game, the conversational history of the player and/or NPC or the general history of the player's path through the game, character traits of the NPC that may bias the way in which the NPC responds, etc.) as input to the generative model 116, the possible natural-language output of the conversational agent are virtually limitless.

In addition to natural language, computer-controlled agents may also generate other types of output, including graphic and programmatic output that can influence and alter the game in manners far beyond a conversation with an NPC. In fact, agents may be multi-modal. For instance, an agent associated with an NPC may create not only conversational output (e.g., suggesting a side quest for the player to pursue), but also programmatic output that creates new game assets, rules, or alterations of the game world associated with the conversational output (e.g., objects or locations associated with the suggested side quest) Non-character assets, such as objects within the game world, may also have associated grounded computer-controlled agents, allowing the player to interact with the asset, e.g., manipulate the object in more ways than are pre-defined. For instance, instead of unlocking a door or box as pre-defined by the game design, a player may try to kick in the door or break the box, and the generative model may facilitate such actions. In this way, the generative model 116, prompted by player interactions, can generate new game content 118 on the fly. In some instances, the new content 118 can be so involved as to affect even the game narrative, creating new narrative elements, paths through the game, and modes of gameplay. In multi-player games, in particular, the collective interactions of players with each other and with the game can result in complex emergent new game behaviors.

The game content 118 generated during gameplay may be fed back into the design process. For example, the visual representation 106 may be updated, from time to time or continuously, to reflect the on-the-fly changes to the game. The game designer 100 may review the changes to decide whether to adopt and explicitly incorporate them into the next game iteration, as is or with further modification, or whether to reject them and possibly change the rules of the game to foreclose the re-emergence of the rejected change during future game deployments. The decision may be based at least in part on empirical evidence of the players' engagement with the original game 110 and the emergent game content 118. For this purpose, player interactions and/or other indicators of player engagement (collectively, engagement data) may be tracked as each player progresses through the game, and from the collected engagement data, engagement metrics 120 may be determined. In various embodiments, the engagement metrics are determined both locally for individual parts of the game (e.g., associated with certain event points, e.g., plot points or sub-goals) and globally for an entire path through the game from start to finish, as well as, optionally, at one or more levels in between (e.g., using a sliding window encompassing multiple parts of the game along a segment or branch of the game path). However, embodiments in which engagement is measured only locally or only globally are also possible.

The engagement metrics 120 may be rule-based and defined based on heuristics. For example, the length of a player's conversation with an NPC or interaction with an object (e.g., measured in the number of dialog turns or individual actions or manipulations), the number of times a player returns to a given location or asset, the completion or abandonment of a quest, and the selection of a path among multiple options at a branchpoint in the storyline may all be implicit indicators of the player's engagement with different parts of the game. Such rules may also analyze the intensity of an interaction; for instance, in a fight, a successive selection of ever more powerful weapons may signify an escalation indicative of high player engagement. Beyond the engagement data implicit in the player's interactions with the game, engagement metrics may also utilize features indicative of real-world reactions of the player to the game. For instance, audio and video signals, e.g., acquired with a microphone or camera, may be processed (with player permission), e.g. with the help of locally executing machine-learning models, to infer such indicators from the player's spoken comments, facial expressions, etc. during gameplay. Self-recordings or live streams posted online by gamers may, for example, be processed in this manner. The derived indicators of real-world reactions can then flow into the computation of the engagement metrics 120.

Alternatively or additionally to relying on rules and heuristics, engagement metrics may also be determined by one or more generative models 119 (which may be a different instance of the model 104 or 116, or a different model). The model(s) 119 may provide a scalar judgment based on one or more signals indicative of player engagement, typically signals of different kinds, including various types of implicit or explicit feedback, e.g., based on monitoring the gameplay and, optionally, acquiring indicators of the player's reaction in the real world. These signals may include the above-listed indicators of player engagement useful for heuristics, but can also include more complex signals, e.g., as derived from interactions with the NPCs. For example, the model(s) 119 may analyze dialog with a conversational agent to discern an associated sentiment, e.g., whether the player is interested, bored, excited, etc. Additionally, an in-game monitor that is typically invisible to the player (but may surface from time to time to provide feedback to the player) may track game interactions and report them, e.g., in summary form, to the model(s) 119. Such interaction summaries may indicate, for instance, whether or to which extent the player followed an NPC's suggestion of a new quest or part of the game world to explore. In some embodiments, multiple instances of the model 119, or multiple API calls to the model 119, act as "sensors" to silently monitor, based on suitably tailored prompts, different aspect of gameplay and likely player engagement. The scores from the different sensors may then serve as input to the determination of an ultimate engagement metric (e.g., computed by another instance of the model 119). Further, the real-time, or local, engagement metrics may be rolled up into a global engagement metric that also includes global engagement indicators, such as whether the player completed the game.

Engagement metrics 120 may be collected and analyzed across potentially many players, and used by the generative model 104 involved in the creation of the game to update the game, typically (but not necessarily) with the game designer 100 in the loop. For example, as noted above, emergent game content 118, if it turns out to be engaging, may be locked in in the next game versions, which sometimes calls for additional narrative elements to be added by the model 104 to tie the emergent content 118 back to the original story. Similarly, if a particular part of the game tends to attract players, the model 104 may decide to elaborate on and extend that part of the game to further enhance player engagement. On the other end of the spectrum, game content that is less engaging, whether part of the original game or added on the fly, may be pruned or assigned lower weight. For example, a player may find a "jail break" or short-cut to achieve the game's overall goal (or a sub-goal), eviscerating the intended game experience and rendering the game overall dull. In this case, the game may be modified to foreclose the possibility of the jail break. On the other hand, a short-cut that is well-liked by players may be kept in the game. In addition to changing the game at large based on player feedback in the aggregate, it is also possible to spawn multiple customized game versions, or dynamically adapt the game, either for an individual player based on that player's feedback and history, or for a group of players with similar gameplay characteristics. For example, a game may adjust the prompting strategy employed with agent-controlled NPCs to bias conversations in a manner that pushes player towards their respective preferred paths.

Player interactions and engagement metrics can generally be tracked, and the game be modified based thereon, at different degrees of granularity. In some embodiments, interactions and metrics are tracked at the level of the nodes within a narrative-state graph that abstracts the game content and narrative into significant event points (represented by the nodes of the graph) and their interdependencies (represented by the edges of the graph). The narrative state graph, or a portion thereof, may, for example, reflect a plotline. The plot line may branch and recombine into subplots in complex ways, and associated event points in the graph may constitute plot points-salient features of the plot that drive the narrative forward in some direction, and sometimes (but not always) constitute branch or convergence points of the sub-plots. Often, the event points (e.g., plot points) are tied to some (sub-)goal or objective for the player to achieve by performing an associated set of actions and engaging with an associated set of game assets (e.g., characters or objects), although event points may also include events in the game that involve the player only passively. Transitions from one event point to another generally involve some kind of state change of the game. For example, the player may have talked to an NPC that provided valuable information or suggestions, obtained (e.g., found, bought, or stolen) a useful object, defeated an NPC standing in the way of completing a quest, acquired a new skill, etc. The game may track these and other items (broadly understood to include objects, information, player conditions, etc.) in a "bag of states" associated with the player, with each addition of an item constituting a state change of the player. Not all state changes are necessarily relevant to the plot or otherwise significant to constitute event points. For instance, the player may collect objects and talk to characters that have no bearing on how the narrative evolves. In some embodiments, the subset of state changes that are plot-relevant or otherwise significant correspond to transitions in the narrative-state graph. A silent generative model instance may be used to monitor for node transitions by discriminating between salient and non-salient activity, e.g., based on the player's history in the game so far and/or the aggregate history of other players that have gone down the same route through the game and their ultimate success or failure.

Typically, the narrative states in a game have conditional interrelations, meaning that some states can be reached only if others have been traversed first. For example, opening a door may depend on first finding the key, defeating a dragon may be dependent on having mastered a particular fighting skill or weapon, a certain quest may become available only upon talking to a particular NPC, and so on. These conditional relations imply a relative ordering of narrative states that implicitly defines a set of possible paths through the narrative state graphs that are possible. The game design may explicitly anticipate some or all of these paths and include prompting strategies for generating the game worlds and game elements that encourage them (e.g., by pre-defining NPC utterances that send the player in the right direction), and conversely prompting strategies that discourage or block dead ends (or undesirable short-cuts).

Tracking player interactions and engagement metrics at the level of nodes within the narrative state graph involves determining a local engagement metric for each node based on the player interactions (and other engagement data) associated with the node, e.g., the set of interactions relevant to and leading up to a certain event point, such as achievement of a particular sub-goal. The local engagement metrics associated with the nodes can then be aggregated along the path that the player traversed between an entry-point into the game and the end goal of the game. From the aggregated local engagement metrics, optionally combined with global indicators of engagement for the traversed path in its entirety, a global engagement metric can be determined. Based on the local and global feedback, the narrative state graph can be pruned or altered, e.g., to eliminate nodes, links, and paths (path segments) found to be unengaging, or to elevate nodes and paths by encouraging them (e.g., via dialog with NPCs). Links between nodes can be added or deleted by altering the conditions that interrelate them. To the extent players deviate from the pre-conceived plotline and explore the game on their own, potentially resulting in emergent game content, interactions and engagement data may be tracked along the way to enable determining, in an analysis after the fact, which set of actions and encounters rise to the level of a new event point to be added to the narrative state graph. In some embodiments, the event points, in addition to including plot points, may also include nodes for parts of the game that are unrelated to the plot of the game, but may be of interest to players in their own right; examples include minigames or parts of the world to explore creatively. Representing those parts as nodes (possibly stand-along nodes, unconnected to the plotline) allows tracking player engagement with them to decide which nodes to keep. In some embodiments, the nodes in the narrative state graph are categorized, in part by relevance to the plot, into various domains, such as, e.g., main quest, side quest, minigame, or no quest. As part of the feedback-based evolution of the game, nodes may be moved between these domains. For instance, a highly engaging side quest or no-quest node may be incorporated into the main quest, and conversely, less engaging parts of the main quest may be relegated to side quests.

As will be apparent from the above description, the interplay between game designer 100, one or more generative machine-learning models 104, 116, and one or more players facilitates the co-creation and continual evolution and/or expansion of the game, with the potential to improve the game experience while at the same time off-loading much of the design work conventionally shouldered by the designer 100. Generative AI is used in this process to create game versions, generate content on the fly, and/or evaluate player engagement. As will be understood by those of ordinary skill in the art, each of these functions may be provided by one or more generative models, with different functions provided by separate respective models or one or more shared models (although generally different instances of the shared model).

Figure 2:
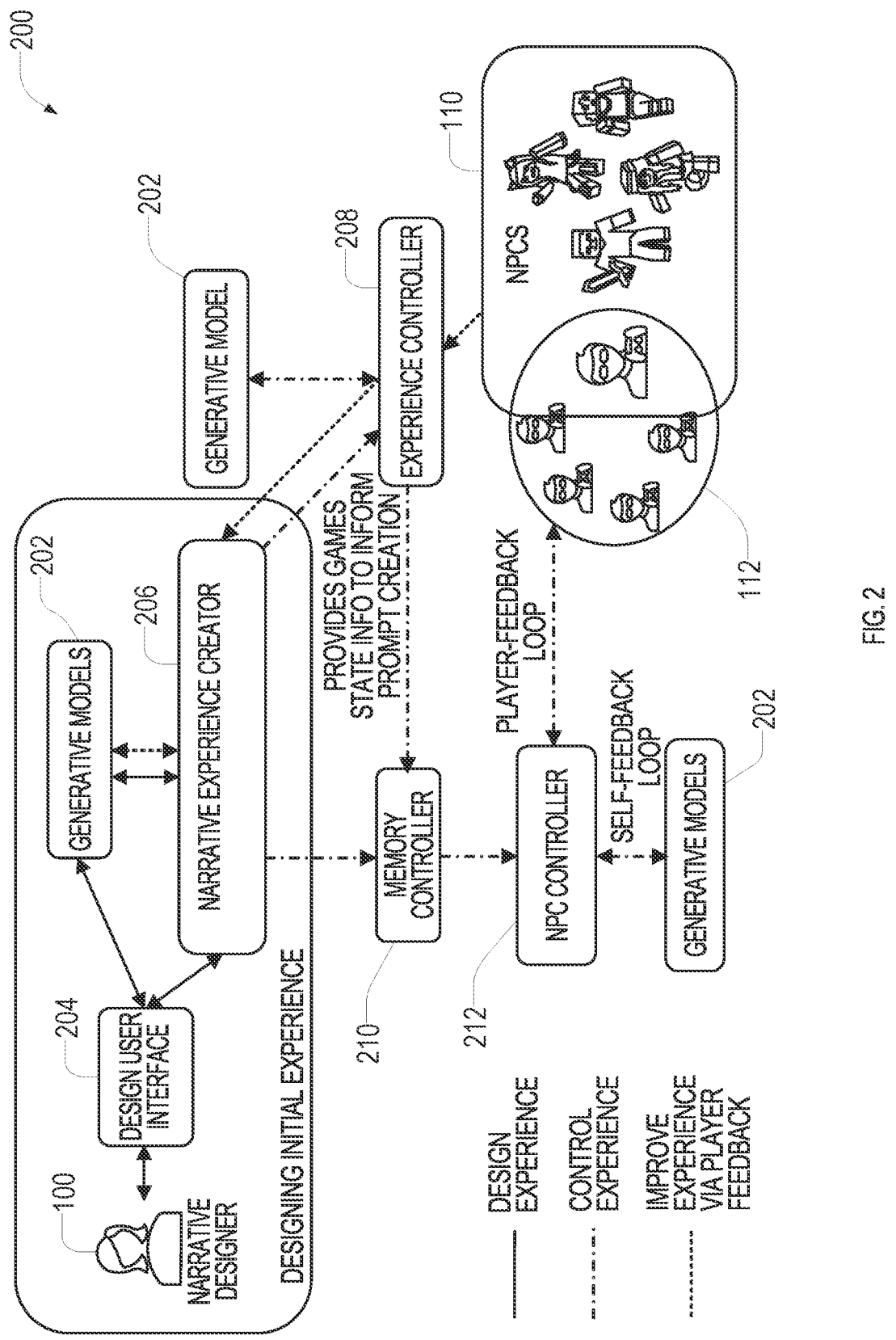
FIG. 2 is a schematic diagram of an example architecture for generating a narrative game experience with player feedback.

FIG. 2 is a schematic diagram of an example architecture 200 for generating a narrative game experience with player feedback, e.g., by implementing the concepts discussed with reference to FIG. 1. The architecture includes various software-implemented modules that interact with the game designer 100, players 112, game 110, and one or more generative machine-learning models (collectively referenced as generative model(s) 202, although the set of models 202 may include multiple individual models to perform different functions with the architecture 200). These modules include a design user interface 204 and narrative experience creator 206 utilized to create the initial game and/or evolve the game following deployment based on user feedback, and an experience controller 208, memory controller 210, and NPC controller 212 used during gameplay to control the player's experience and collect feedback for future iterations.

In the design phase, the game designer (or group of designers) 100 interacts via the design user interface 204 with the narrative experience creator 206 and/or the generative model(s) 202 to iteratively design the initial narrative experience. Based on a prompt from the designer 100 that gives a high-level description of the experience in natural language (e.g., by defining a high-level goal of the narrative arc), the generative model(s) 202 in conjunction with the narrative experience creator 206 create a representation of the narrative experience. The narrative experience creator 206 may, for instance, process the model output to generate the representation. In some cases, this may involve another API call to the generative model(s) 202. The narrative experience representation may include a narrative state graph with nodes and edges between them to form paths through the graph, e.g., a sub-goal graph whose nodes represent sub-goals of the experience (which might be a quest). In addition to the narrative state graph, the representation may provide details of the narrative arc, e.g., descriptions of the sub-goals. Further, the narrative experience representation may include a list of NPCs and their personas, including, e.g., character descriptions, skills, assets, and/or lore knowledge available to the NPC. The representation may also include details of the game world, e.g., locations of the NPCs and "biomes" in which the NPCs live, locations of assets around the NPCs and assets required for the completion of sub-goals at various locations, etc. The list may include more NPCs and/or more assets and locations than needed for the narrative, to allow for exploration on the part of the player.

The textual descriptions and graph (and other representations, such as, e.g., images of parts of the game world or of the characters and assets) may be displayed to the designer 100, e.g., in the design user interface 204. Further, in addition to representing the game in an abstracted form, the user interface 204 may display a preview of parts of the game, based on execution of a coded implementation. The designer 100 may iterate on the representation, e.g., by providing more text input as a revised or additional prompt for the generative models 20(2), or by directly editing the representation (e.g., adding nodes into the graph). For example, the game designer 100 may point at, touch (on a touchscreen), mouse over, click or drag nodes and edges in the user interface and/or annotate them verbally to change the flow of the game or add content (e.g., NPCs or assets) to selected nodes. Additionally, the game designer may describe or show desired modifications to the visual and other aspects of the game world, how NPCs and other assets should look, sound, or behave, etc. In addition to receiving input via traditional user input devices like keyboard and mouse, the user interface 204 may utilize a camera and/or microphone to allow the designer 100 to demonstrate certain aspects of the game, e.g., show how an NPC should move or speak in a voice desired for an NPC. Based on the designer input on the initial game design, the narrative experience creator 206 and generative models 202 may then further update the game, including the description and/or the graph, e.g., using the designer-modified graph as a new prompt. For example, upon addition of a new node to the graph by the designer, a completion path that connects the new node to the original node may be generated, which may involve the addition of further new nodes. The narrative experience create 206 and generative model(s) 202 may have the ability to convert text descriptions to graph representations and vice versa. In some embodiments, a group of game designers 100 collaboratively create the game, e.g., by simultaneously modifying different parts or aspect of the game.

Once the game 110 is deployed, the experience controller 208 keeps the experience on track with the help of the memory controller 210 and NPC controller 212. That may involve predicting, at a particular point in the game, a suitable next narrative state (e.g., a suitable next sub-goal for the player to pursue) based on the player's gameplay history and the predefined narrative state graph, and reading the game state (including any changes in the game environment cause by the actions of the player and/or NPCs) and passing that information on to the memory controller 210. For its prediction tasks, the experience controller may use a prompt-based approach on the generative models 202. The memory controller 210, which maintains a history of the game based on the inputs provided by the experience controller 208 (e.g., the narrative state graph, predicted next node, and real-time game state) over time, decides which information to pass on, e.g., in summarized form, to the NPC controller 212. The NPC controller 212, in turn, operates on input from the memory controller 210 to generate real-time responses for each of the NPCs, using the generative models 202. The responses may be geared towards encouraging the player to pursue the predicted new sub-goal. The NPC controller 212 may include or control multiple agents operating the individual NPCs, and coordinate their actions. The NPC controller 212 may also update itself based on player feedback and in a self-feedback loop based on a self-evaluation of its own performance. For instance, the NPC controller 212 may call the model(s) 202 to evaluate the player's response and determine, e.g., whether the NPC's interactions with the player furthered the experience of the game, and then possibly cause the NPC's behavior to modify (e.g., to be less rude or more cooperative in future turns).

The experience controller 208 also serves to improve the player experience by identifying narrative paths that are most engaging for the players from implicit engagement feedback, as well as by detecting emergent (player-created) new narrative states (e.g., new sub-goals) that can be folded into the evolving game design. For instance, the player may deviate from the defined experience and have new, unplanned interactions (e.g., with NPCs or the game environment). By analyzing player interaction logs, the experience controller 208 can detect or predict new emerging nodes, which it may then automatically integrate into the experience (including, e.g., by graph completion, i.e., adding further nodes until a connection to the original graph is established) or pass on to the narrative experience creator for the next design iteration. Further, based on collected player engagement data and engagement metric derived therefrom, the experience controller 208 may predict new engaging paths were desirable. For example, if player engagement along a certain path is high until a certain node is reached and drops off after that, new nodes that may increase player engagement may be predicted. The addition of new nodes involve adding new NPCs and/or new locations.

Figure 3:
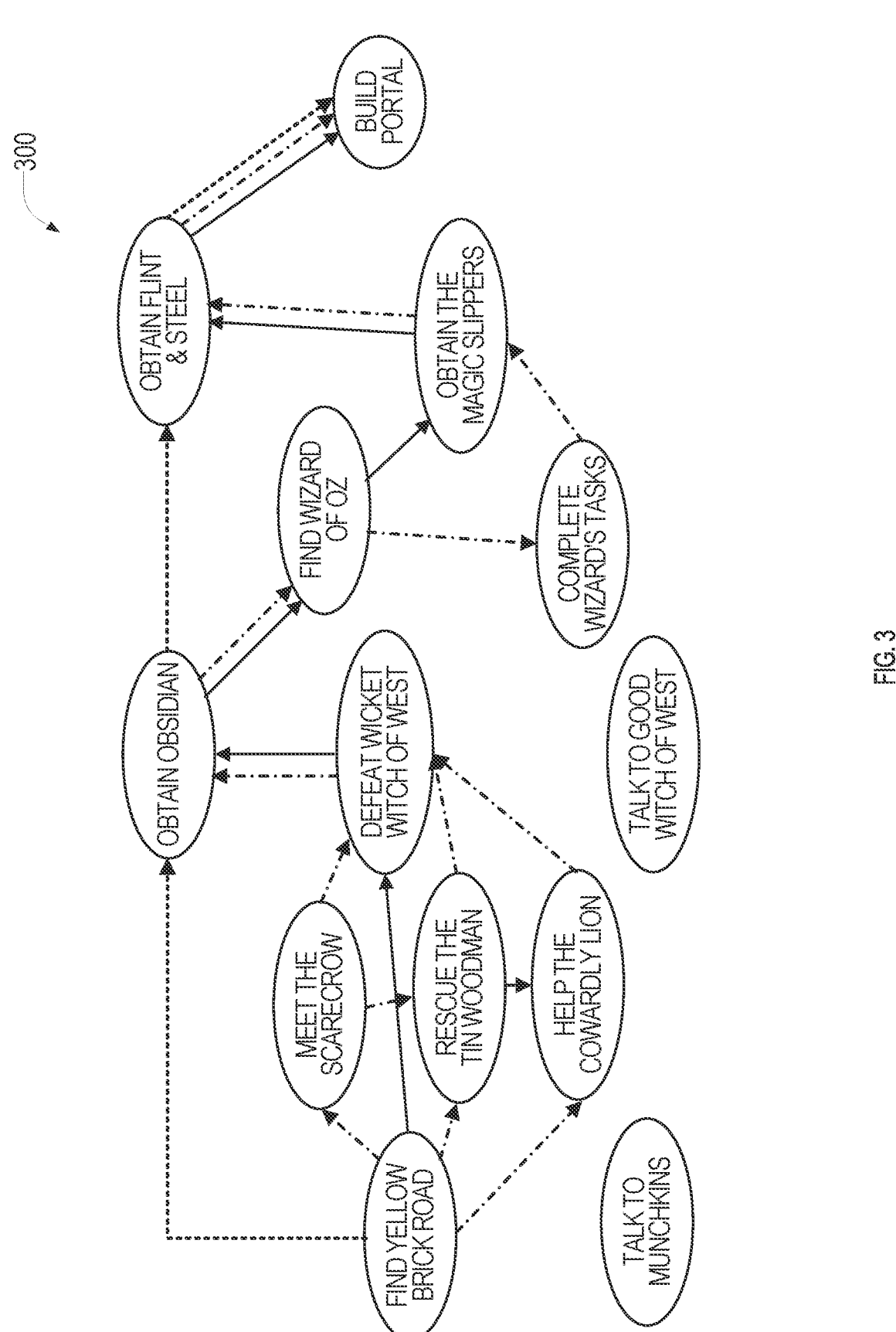
FIG. 3 is an example narrative state graph for a narrative game experience designed with a generative model.

FIG. 3 is an example narrative state graph 300 for a narrative game experience designed with a generative model, illustrating the power of AI in game design. In this example, the generative model was provided with the following prompt:

"Write a role-playing video game based on the book 'The Wonderful Wizard of Oz.' In this game, the player should play the role of Dorothy. The non-player characters in the game are the other characters in the book. This game will be played within Minecraft. The items and the scenes should correspond to what is possible in Minecraft There should be a high-level goal for the player aka Dorothy and there should also be lower-level sub-goals. The sub-goals could either be driven by NPCs or by other plot points in the book.

Represent the gameplay using a graph where nodes are sub-goals and edges are paths between the sub-goals. The graph should not be sequential. It should be complex and have edges between several sub-goals. Write in detail what each of the sub-goals are and what the different paths between the sub-goals are."

From the above prompt, the generative model created the following summary of the game:

"Gameplay Overview: In this role-playing video game, the player takes on the role of Dorothy, who is on a quest to return home to Kansas. The game is set within Minecraft, where the player must navigate through a variety of terrains and overcome challenges to complete the game. Along the way, the player will interact with the other characters from the book, who will provide guidance and quests to complete.

High-level Goal: The main goal of the game is for Dorothy to collect the necessary materials to build a portal to return home to Kansas. The materials are scattered throughout the game, and Dorothy must complete a series of sub-goals to gather them all."

Further, the generative model provided, as prompted, descriptions of each of the sub-goals in the narrative state graph:

"Find the Yellow Brick Road: The first sub-goal is to find the Yellow Brick Road, which will lead Dorothy to the land of Oz. The Yellow Brick Road can be found in a nearby field, but the player must collect resources such as wood and stone to build a bridge over a river to reach it.

Collect the Ingredients: To build a nether portal, Dorothy must obtain obsidian, flint and steel. Each of these ingredients is located in a different location in the game world, and Dorothy must find them all in order to progress towards her goal.

Defeat the Wicked Witch of the West: The Wicked Witch of the West is the main antagonist in the game, and Dorothy must defeat her in order to obtain one of the main ingredients for the nether portal, obsidians. The Wicked Witch of the West resides in her castle, which is located in a dangerous region of the game world. Dorothy must gather the necessary resources and allies to defeat the witch and obtain obsidians.

Meet the Scarecrow: Once Dorothy reaches Oz, she will meet the Scarecrow, who needs help finding his missing brain. Dorothy must navigate through a maze to find the brain and return it to the Scarecrow.

Rescue the Tin Woodman: Dorothy comes across the Tin Woodman, who is rusted and unable to move. Dorothy must collect oil and use it to lubricate the Tin Woodman's joints, freeing him from his rusted state.

Help the Cowardly Lion: Dorothy meets the Cowardly Lion, who needs help gaining courage. Dorothy must collect ingredients and brew a potion that will give the Lion the courage he needs to move forward.

Obtain the Magic Slippers: The Magic Slippers are a powerful item in the game, and they are required to open a special portal that will allow Dorothy to travel to the location of the final ingredient (flint and steel) for the portal. The Magic Slippers are with the Wizard of Oz.

Find the Wizard of Oz: After defeating the witch, Dorothy must travel through a field of poppies to reach the Wizard's castle. The poppies will make the player sleepy, so they must gather materials to make a remedy that will keep them awake.

Complete the Wizard's Tasks: Once Dorothy reaches the Wizard's castle, they will be given a set of tasks to complete before the Wizard will grant them an audience. These tasks involve finding and collecting various items from around the land of Oz.

Build portal: Once Dorothy has the required ingredients i.e. obsidians and flint and steel, she builds a portal to reach back home."

As can be seen, the narrative state graph includes, in addition to the above-described interconnected nodes, also a couple of unconnected nodes, labeled "Talk to Munchkins" and "Talk to Good Witch of West." These nodes may correspond to event points that, although not essential for completing the game's goal (and therefore not incorporate into the game paths), nonetheless may provide for engaging interactions and as such have potential to enhance the game experience.

Finally, the generative model identified a number of available paths (indicated by arrows in FIG. 3) and provided a general characterization linked to the type of gameplay preferred by the player:

"There are multiple paths that Dorothy can take to reach her ultimate goal of building the nether portal. Here are a few possible paths:

Path 1: The Direct Route. Dorothy could choose to take the direct route to the three ingredients, defeating the Wicked Witch of the West along the way, and then traveling to the Emerald City to obtain the Magic Slippers. This path requires Dorothy to be resourceful and skilled in combat, as she will face many challenges along the way.

Path 2: The Diplomatic Route. Alternatively, Dorothy could choose to take a more diplomatic approach, making alliances with various characters in the game world to help her reach her goal. For example, she could ally with the Scarecrow, Tin Man, and Cowardly Lion to defeat the Wicked Witch of the West, and then work with the Wizard of Oz to obtain the Magic Slippers. This path requires good negotiation skills and careful planning.

Path 3: The Scavenger Route. Another option for Dorothy is to take the scavenger route, searching the game world for useful items and resources that will help her reach her goal. She could explore various dungeons and caves to find obsidian and flint, and trade with other characters in the game world to obtain the final ingredient. This path requires a keen eye for detail and a willingness to take risks."

Figure 4:
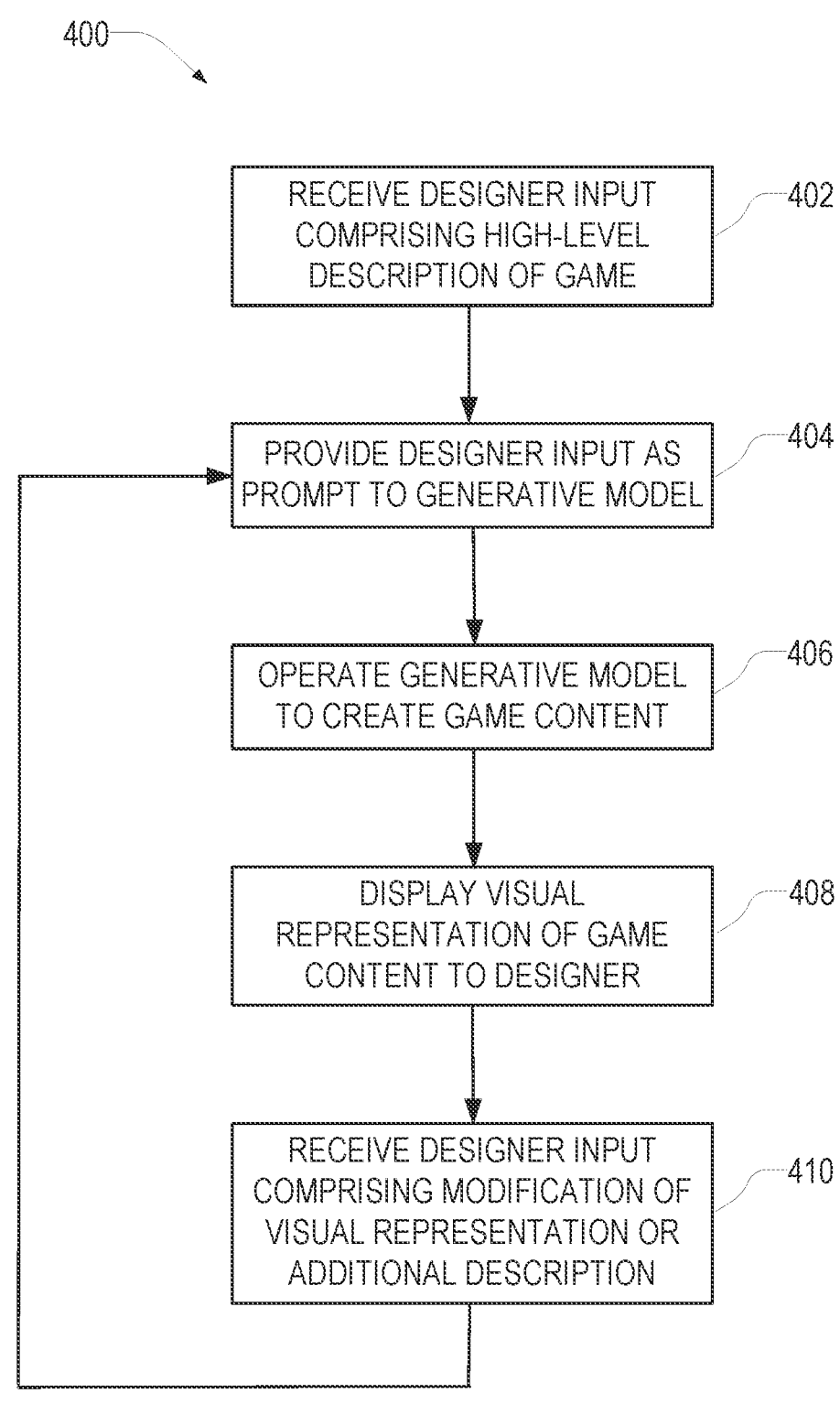
FIG. 4 is a flowchart of an example iterative method of creating a game with the aid of a generative model.

FIG. 4 is a flowchart of an example iterative method 400 of creating a game with the aid of a generative model. The method begins with the receipt of designer input from a (human) game designer, e.g., at a design user interface 204 (operation 402). The designer input may include a typically high-level verbal (i.e., natural-language) description of the game, although other input modalities (e.g., visual and audio content) may also be provided. The designer input is provided as a prompt to a generative machine-learning model (or multiple models, e.g., models 104, 202) (operation 404), and the model is operated to create game content, e.g., including a game narrative, characters, world details, etc. (operation 406). A visual representation of the game content is then displayed to the game designer, e.g., again in the design user interface 204 (operation 408).

Based on this visual representation, the game designer may provide additional designer input, e.g., an additional natural-language description or a manual modification of the visual representation. For example, the visual representation may be or include a narrative state graph with nodes representing event points in the game, and the game designer may manipulate the state graph, e.g., by adding or removing nodes. Upon receipt of the additional designer input (operation 410), the addition input is provided to the generative model as a revised prompt (new instance of operation 404), and the generative model is operated on the revised prompt to generate revised game content (new instance of operation 406). For example, if the game designer added a new node, the revised game content may include a new narrative state graph that includes the node, and potentially other new, automatically created nodes to connect the designer-added nodes to the original graph. The revised visual representation may again be displayed to the game designer (new instance of operation 408), and the process of generating or revising the game content with the help of the generative model based on revised designer input (operations 404-410) may be repeated until the game designer is satisfied with the game content.

Figure 5:
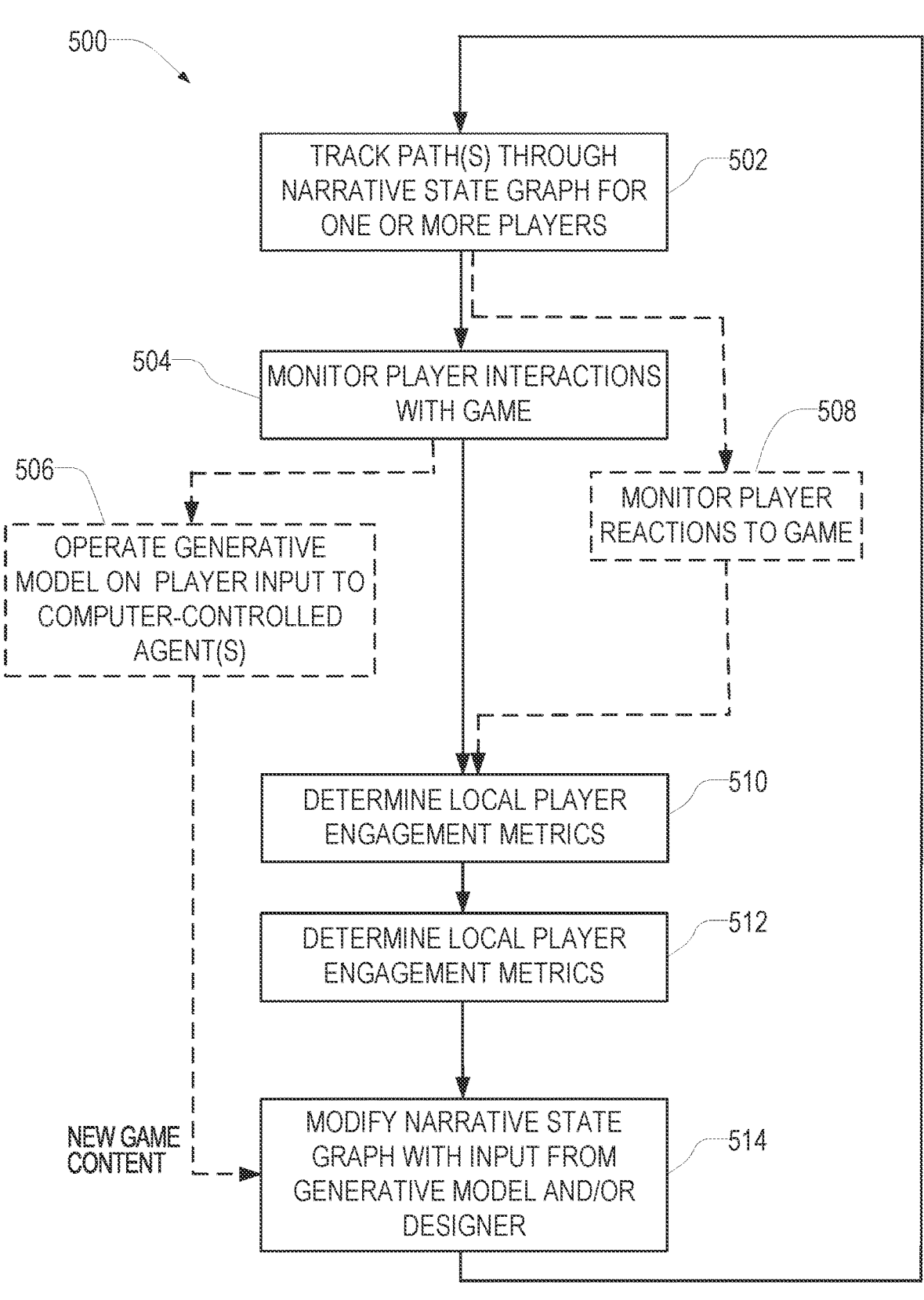
FIG. 5 is a flowchart of an example method of evolving a game based on player interactions and engagement metrics.

FIG. 5 is a flowchart of an example method 500 of evolving a game based on player interactions and engagement metrics. The method 500 involves tracking the path of one or more players through the narrative state graph associated with the game (operation 502) and monitoring player interactions with the game along the path(s) (operations 504). The player interactions may include interactions with NPCs (and/or non-character assets) that are controlled by grounded computer-controlled agents, and in the course of these interactions, one or more generative models operating on prompts comprising player input may generate new game content (e.g., NPC responses, programmatic content, etc.) (operation 506) In the case of multi-player games, the monitored interactions may also include interactions between the players, and/or the operation of generative models on prompts that are based on inputs from multiple players taken in conjunction. In some cases, the interactions of players with NPCs and/or with each other are so complex that the generated new content rises to the level of emergent new game behaviors, such as a new event node within the game narrative. In addition to the player interactions within the game, the player reactions to the game in the real world (e.g., the players' spoken reaction, movements, or facial expression) may also be monitored (operation 508).

The monitored interactions, if applicable in conjunction with the real-world player reactions, are used to determine local player engagement metrics along each player's path (operation 510), such as, e.g., engagement metrics associated with the nodes of the narrative state graph that the player traversed. In some embodiments, one or more generative models are used in the process of measuring engagement. For example, generative models may process one or more signals indicative of player engagement (including player interactions with the game and, optionally, even measured real-world reactions) to generate the engagement metrics or scores flowing into the computation of the engagement metrics. In addition to local engagement met- rics, a global engagement metric is also determined for each path (operation 512). The local and global engagement metrics, in conjunction with any new game content (in particular any emergent nodes), are then used to modify the game, and in particular the narrative state graph (operation 514). The modification may be made manually by a game designer (e.g., based on a visualization of the engagement metrics and the content generated during gameplay), auto- matically by a generative model, and/or in a collaborative process that involves iterations on the game by the genera- tive model with feedback from the designer, similar to the initial game design process described with respect to FIG. 4. The modifications may include incorporating new nodes or other emergent game content into the game, which may involve further modifications made by the designer and/or model, or rejecting emergent content and/or foreclosing certain paths and modes of gameplay, depending on the measured user engagement (e.g., aggregated across multiple players) at the local and global levels.

The above-described systems and methods may be imple- mented with a suitable combination of computing hardware and software, e.g., with software executed by general- purpose processors. Optionally, certain functions (e.g., graphics processing and execution of the generative machine-learning model) may be performed by hardware accelerators (e.g., graphic process units (GPUs), AI accel- erators such as physical neural networks, etc.). In some embodiments, a single computing machine performs a method as described herein in its entirety. For example, a player may in principle run the game and associated con- trollers (e.g., experience, memory, and NPC controllers as described with reference to FIG. 2) as well as the (pre- trained) generative model(s) on a single personal device. Similarly, a designer may use a single machine to run all components necessary to create the game, including the generative model(s). In other embodiments, the describe approach is implemented across a network of computing machines, e.g., in a client-server configuration. The different components may be distributed over the network in various ways. For instance, players may each execute the game locally on their respective devices, but with access to one or more generative models hosted on a central server (or group of servers). Or, in a multi-player scenario, the game and generative models may all run on a central server or server farm that communicates with the players' devices via a network connection (e.g., an intranet or the internet). Vari- ous possible configurations will be readily apparent to those of ordinary skill in the art.

Figure 6:
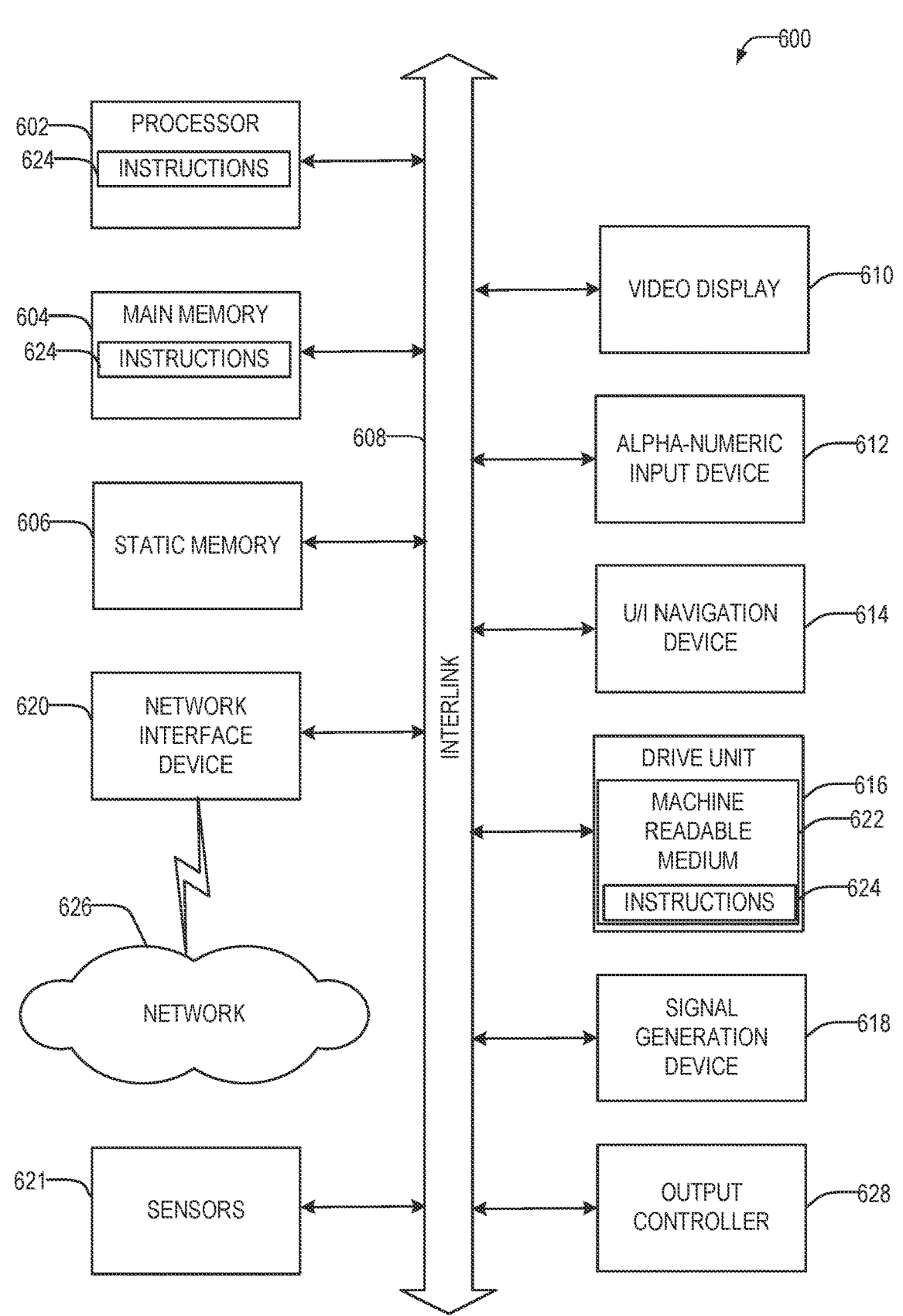
FIG. 6 is a block diagram of an example computing machine for creating and evolving a game as described herein.

FIG. 6 is a block diagram of an example computing machine 600 for creating and evolving a game as described herein. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a smartphone, a web appliance, a network router, switch or bridge, a server computer, a database, conference room equipment, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud comput- ing, software as a service (SaaS), other computer cluster configurations. In various embodiments, one or more machine(s) 600 may perform one or more of the processes described above with respect to FIGS. 1-5. For example, one or more machines 600 may implement (e.g., execute) any or all of the generative machine-learning models 104, 116, 202, the game 110, and/or the modules 204, 206, 208, 210, 212 of FIGS. 1 and 2, and/or perform any or all of operations for the creation of a narrative game experience and its modifi- cation based on player feedback as depicted in FIGS. 4 and 5.

Machine (e.g., computer) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a camera, microphone, global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communi- cation (NFC), etc.) connection to communicate or control one or more peripheral devices (e.g., a printer, card reader, etc.).

The storage device 616 may include a machine-readable medium 622 on which are stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a central- ized or distributed database, and/or associated caches and servers) configured to store the one or more instructions 624.

The term "machine-readable medium" may include any medium that is capable of storing, encoding, or carrying instructions for execution by the machine 600 and that cause the machine 600 to perform any one or more of the tech- niques of the present disclosure, or that is capable of storing, encoding or carrying data structures used by or associated with such instructions Non-limiting machine-readable medium examples may include solid-state memories, and optical and magnetic media. Specific examples of machine- readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine-readable media. In some examples, machine-readable media may include machine-readable media that are not a transitory propagating signal.

The instructions 624 may further be transmitted or received over a communications network 626 using a transmission medium via the network interface device 620. The machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The following numbered examples are illustrative embodiments.

1. A method comprising: tracking a player's path through a narrative state graph associated with a computer-implemented narrative game, the narrative state graph comprising a plurality of nodes corresponding to event points in the game; monitoring the player's interactions with game assets along the player's path; determining, for each node along the player's path, a local player engagement metric based at least in part on the monitored interactions associated with the node; determining a global player engagement metric based at least in part on the monitored interactions associated with all nodes along the player's path, and using a foundation model to modify the narrative state graph based on the local and global player engagement metrics.

2. The method of example 1, wherein the local and global player engagement metrics are determined by the foundation model or another foundation model.

3. The method of example 1 or example 2, further comprising acquiring indicators of the player's real-world reaction to the game along the player's path as derived from at least one of audio or video signals, wherein the local and global player engagement metrics are determined further based on the indicators of the player's real-world reaction.

4. The method of any of examples 1-3, wherein modifying the narrative state graph comprises at least one of adding a node to the narrative state graph, deleting a node from the narrative state graph, adding a link between a pair of nodes, or deleting a link between a pair of nodes.

5. The method of any of example 1-4, wherein each of the plurality of nodes falls into one of a plurality of domains, the plurality of domains comprising at least two of main quest, side quest, no quest, and minigame, and wherein modifying the narrative state graph comprises moving at least one of the nodes from one domain to another domain.

6. The method of any of examples 1-5, wherein the player's path is tracked, the player's interactions are monitored, and local and global player engagement metrics are determined for multiple players, and wherein the foundation model is used to modify the narrative state graph based on an aggregate of the local and global engagement metrics of the multiple players.

7. The method of example 6, wherein monitoring the player's interactions for multiple players comprises monitoring interactions between the multiple players via the game, and wherein the narrative state graph is modified further based in part on the interactions between the multiple players.

8. The method of any of examples 1-7, wherein the game assets comprise one or more assets controlled by one or more computer-controlled agents and the monitored interactions comprise player input to the one or more computer-controlled agents, the method further comprising operating the foundation model or another foundation model on prompts comprising the player input to generate a model output, and controlling the one or more computer-controlled agents at least in part based on the model output.

9. The method of example 8, wherein modifying the narrative state graph comprises incorporating at least a portion of the model output into the narrative state graph.

10. The method of example 8 or example 9, wherein the player's interactions are monitored for multiple players and wherein the model output is based on monitored interactions of the multiple players with multiple computer-controlled agents used in conjunction.

11. The method of any of examples 8-10, wherein the one or more computer-controlled agents comprise a conversational agent controlled at least in part based on natural-language model output generated by the foundation model from a prompt comprising natural-language player input received as part of the monitored interactions.

12. The method of example 11, wherein the conversational agent is associated with a non-player character.

13. The method of any of examples 8-12, wherein at least one of the one or more computer-controlled agents is controlled at least in part based on programmatic output generated by the foundation model from the prompts.

14. The method of any of examples 8-13, wherein the foundation model operating on the prompts comprising the player input is a multi-modal model and the one or more computer-controlled agents are controlled based on multi-modal model output of the multi-modal foundation model.

15. The method of example 14, wherein the multi-modal model output comprises at least two of natural-language output, programmatic output, and visual output.

16. A system comprising: one or more computer processors; and computer memory storing instructions which, when executed, cause the one or more computer processors to perform operations comprising: tracking a player's path through a narrative state graph associated with a computer-implemented narrative game, the narrative state graph comprising a plurality of nodes corresponding to event points in the game; monitoring the player's interactions with game assets along the player's path; determining, for each node along the player's path, a local player engagement metric based at least in part on the monitored interactions associated with the node; determining a global player engagement metric based at least in part on the monitored interactions associated with all nodes along the player's path; and using a foundation model to modify the narrative state graph based on the local and global player engagement metrics.

17. The system of example 16, wherein the local and global player engagement metrics are determined by the foundation model or another foundation model.

18. The system of example 16 or example 17, wherein modifying the narrative state graph comprises at least one of adding a node to the narrative state graph, deleting a node from the narrative state graph, adding a link between a pair of nodes, or deleting a link between a pair of nodes.

19. The system of any of examples 16-18, wherein the game assets comprise one or more assets controlled by one or more computer-controlled agents and the monitored interactions comprise player input to the one or more computer-controlled agents, the operations further comprising operating the foundation model or another foundation model on prompts comprising the player input to generate a model output, and controlling the one or more computer-controlled agents at least in part based on the model output, wherein modifying the narrative state graph comprises incorporating at least a portion of the model output into the narrative state graph.

20. The system of example 16, configured to implement the method of any of examples 2-15.

21. A machine-readable medium storing machine-readable instructions which, when executed by one or more computer processors, cause the one or more computer processors to perform operations comprising: tracking a player's path through a narrative state graph associated with a computer-implemented narrative game, the narrative state graph comprising a plurality of nodes corresponding to event points in the game; monitoring the player's interactions with game assets along the player's path; determining, for each node along the player's path, a local player engagement metric based at least in part on the monitored interactions associated with the node; determining a global player engagement metric based at least in part on the monitored interactions associated with all nodes along the player's path; and using a foundation model to modify the narrative state graph based on the local and global player engagement metrics.

22. The machine-readable medium of example 21, wherein the operations comprise operations implementing the method of any of examples 2-15.

23. A method of creating a narrative computer game, the method comprising: receiving, at a design user interface, designer input from a game designer, the designer input comprising a natural-language description of a computer-implemented narrative game; providing the designer input as a prompt to a foundation model; operating the foundation model on the prompt to create game content; and displaying a visual representation of the game content to the game designer in the design user interface.

24. The method of example 23, further comprising: receiving, at the design user interface, additional designer input from the game designer, the additional designer input comprising at least one of a modification of the visual representation or an additional natural-language description; providing the additional designer input as a revised prompt to the foundation model; operating the foundation model on the revised prompt to create revised game content; and displaying a visual representation of the revised game content to the game designer in the design user interface.

25. The method of example 24, further comprising: repeating, one or more times, the steps of receiving additional designer input, providing the additional designer input as revised prompt to the foundation model, operating the foundation model on the revised prompt to generate revised game content, and displaying a visual representation of the revised game content.

26. The method of any of examples 23-25, wherein the visual representation comprises a narrative state graph associated with the computer-implemented narrative game, the narrative state graph comprising a plurality of nodes corresponding to event points in the game.

27. The method of any of examples 24-26, wherein the additional designer input comprises a modification to the narrative state graph.

28. The method of example 27, wherein the modification to the narrative state graph comprises adding one or more nodes, and wherein creating the revised game content comprises completing the narrative state graph to incorporate the one or more added nodes into the narrative state graph.

29. A system comprising: one or more computer processors; and computer memory storing instructions which, when executed, cause the one or more computer processors to perform operations to implement any of the methods of examples 23-28.30. A machine-readable medium storing machine-readable instructions which, when executed by one or more computer processors, cause the one or more computer processors to perform operations to implement any of the methods of examples 23-28.

31. A method comprising: tracking a player's path through a narrative state graph associated with a computer-implemented narrative game, the narrative state graph comprising a plurality of nodes corresponding to event points in the game; monitoring the player's interactions with game assets along the player's path, the game assets comprising one or more assets controlled by one or more grounded computer-controlled agents that provide player input to a foundation model to generate model output; determining, for each node along the player's path, a local player engagement metric based at least in part on the monitored interactions associated with the node; determining a global player engagement metric based at least in part on the monitored interactions associated with all nodes along the player's path; and modify the narrative state graph based on the model output in conjunction with the local and global player engagement metrics.

32. The method of example 31, wherein the narrative state graph is modified by the foundation model or another foundation model.

33. The method of example 31, wherein the narrative state graph is modified based on input from a game designer responsive to the model output and the local and global player engagement metrics.

34. A system comprising: one or more computer processors; and computer memory storing instructions which, when executed, cause the one or more computer processors to perform operations to implement any of the methods of examples 31-33.

35. A machine-readable medium storing machine-readable instructions which, when executed by one or more computer processors, cause the one or more computer processors to perform operations to implement any of the methods of examples 31-33.

36. A method comprising: tracking a player's path through a narrative state graph associated with a computer-implemented narrative game, the narrative state graph comprising a plurality of nodes corresponding to event points in the game; monitoring the player's interactions with game assets along the player's path; using a foundation model to determine, for each node along the player's path, a local player engagement metric based at least in part on the monitored interactions associated with the node; using the foundation model to determine a global player engagement metric based at least in part on the monitored interactions associated with all nodes along the player's path; and modify the narrative state graph based at least in part on the local and global player engagement metrics.

37. A system comprising: one or more computer processors; and computer memory storing instructions which, when executed, cause the one or more computer processors to perform operations to implement the method of example 36.

38. A machine-readable medium storing machine-readable instructions which, when executed by one or more computer processors, cause the one or more computer processors to perform operations to implement the method of example 36.

The systems and methods described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

What is claimed is:

1. A method comprising:
tracking a player's path through a narrative state graph associated with a computer-implemented narrative game, the narrative state graph comprising a plurality of nodes corresponding to event points in the game;
monitoring the player's interactions with game assets along the player's path;
determining, for each node along the player's path, a local player engagement metric based at least in part on the monitored interactions associated with the node;
determining a global player engagement metric based at least in part on the monitored interactions associated with all nodes along the player's path; and
using a foundation model to modify the narrative state graph based on the local and global player engagement metrics.

2. The method of claim 1, wherein the local and global player engagement metrics are determined by the foundation model or another foundation model.

3. The method of claim 1, further comprising acquiring indicators of the player's real-world reaction to the game along the player's path as derived from at least one of audio or video signals, wherein the local and global player engagement metrics are determined further based on the indicators of the player's real-world reaction.

4. The method of claim 1, wherein modifying the narrative state graph comprises at least one of adding a node to the narrative state graph, deleting a node from the narrative state graph, adding a link between a pair of nodes, or deleting a link between a pair of nodes.

5. The method of claim 1, wherein each of the plurality of nodes falls into one of a plurality of domains, the plurality of domains comprising at least two of main quest, side quest, no quest, and minigame, and wherein modifying the narrative state graph comprises moving at least one of the nodes from one domain to another domain.

6. The method of claim 1, wherein the player's path is tracked, the player's interactions are monitored, and local and global player engagement metrics are determined for multiple players, and wherein the foundation model is used to modify the narrative state graph based on an aggregate of the local and global engagement metrics of the multiple players.

7. The method of claim 6, wherein monitoring the player's interactions for multiple players comprises monitoring interactions between the multiple players via the game, and wherein the narrative state graph is modified further based in part on the interactions between the multiple players.

8. The method of claim 1, wherein the game assets comprise one or more assets controlled by one or more computer-controlled agents and the monitored interactions comprise player input to the one or more computer-controlled agents, the method further comprising operating the foundation model or another foundation model on prompts comprising the player input to generate a model output, and controlling the one or more computer-controlled agents at least in part based on the model output.

9. The method of claim 8, wherein modifying the narrative state graph comprises incorporating at least a portion of the model output into the narrative state graph.

10. The method of claim 8, wherein the player's interactions are monitored for multiple players and wherein the model output is based on monitored interactions of the multiple players with multiple computer-controlled agents used in conjunction.

11. The method of claim 8, wherein the one or more computer-controlled agents comprise a conversational agent controlled at least in part based on natural-language model output generated by the foundation model from a prompt comprising natural-language player input received as part of the monitored interactions.

12. The method of claim 11, wherein the conversational agent is associated with a non-player character.

13. The method of claim 8, wherein at least one of the one or more computer-controlled agents is controlled at least in part based on programmatic output generated by the foundation model from the prompts.

14. The method of claim 8, wherein the foundation model operating on the prompts comprising the player input is a multi-modal model and the one or more computer-controlled agents are controlled based on multi-modal model output of the multi-modal foundation model.

15. The method of claim 14, wherein the multi-modal model output comprises at least two of natural-language output, programmatic output, and visual output.

16. A system comprising:

one or more computer processors; and computer memory storing instructions which, when executed, cause the one or more computer processors to perform operations comprising:

tracking a player's path through a narrative state graph associated with a computer-implemented narrative game, the narrative state graph comprising a plurality of nodes corresponding to event points in the game;

monitoring the player's interactions with game assets along the player's path;

determining, for each node along the player's path, a local player engagement metric based at least in part on the monitored interactions associated with the node;

determining a global player engagement metric based at least in part on the monitored interactions associated with all nodes along the player's path; and using a foundation model to modify the narrative state graph based on the local and global player engagement metrics.

17. The system of claim 16, wherein the local and global player engagement metrics are determined by the foundation model or another foundation model.

18. The system of claim 16, wherein modifying the narrative state graph comprises at least one of adding a node to the narrative state graph, deleting a node from the narrative state graph, adding a link between a pair of nodes, or deleting a link between a pair of nodes.

19. The system of claim 16, wherein the game assets comprise one or more assets controlled by one or more computer-controlled agents and the monitored interactions comprise player input to the one or more computer-controlled agents, the operations further comprising operating the foundation model or another foundation model on prompts comprising the player input to generate a model output, and controlling the one or more computer-controlled agents at least in part based on the model output, wherein modifying the narrative state graph comprises incorporating at least a portion of the model output into the narrative state graph.

20. A non-transitory machine-readable medium storing machine-readable instructions which, when executed by one or more computer processors, cause the one or more computer processors to perform operations comprising:

tracking a player's path through a narrative state graph associated with a computer-implemented narrative game, the narrative state graph comprising a plurality of nodes corresponding to event points in the game;

monitoring the player's interactions with game assets along the player's path;

determining, for each node along the player's path, a local player engagement metric based at least in part on the monitored interactions associated with the node;

determining a global player engagement metric based at least in part on the monitored interactions associated with all nodes along the player's path; and using a foundation model to modify the narrative state graph based on the local and global player engagement metrics.

* * * * *